Figure 1:
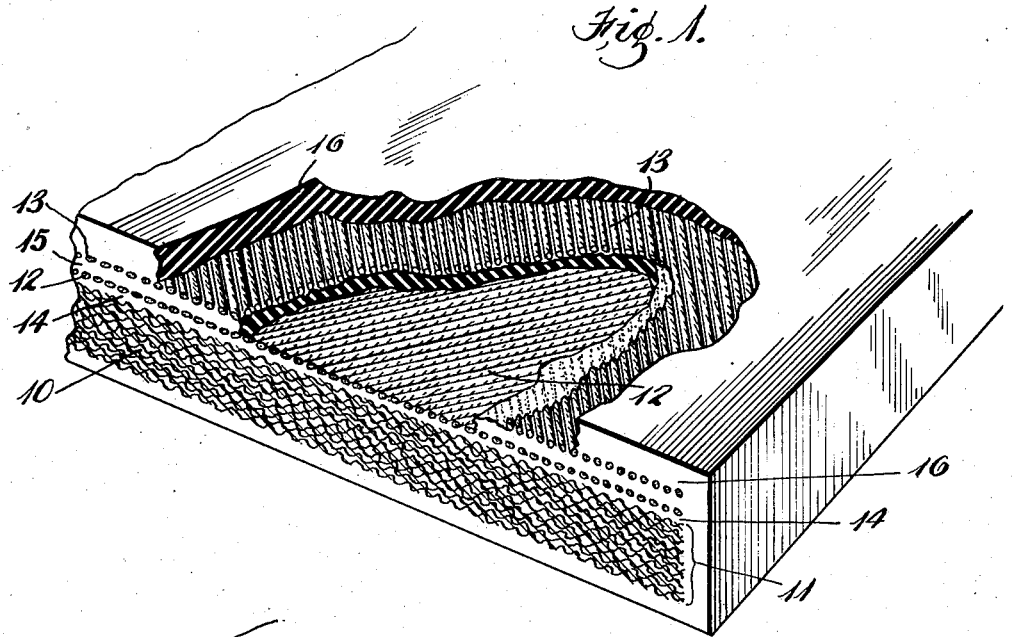

June 5, 1945. S. R. REIMEL 2,377,650
BELT
Filed Oct. 24, 1942

Inventor
Samuel R. Reimel
By Willis F. Avery
Atty.

Patented June 5, 1945

2,377,650

UNITED STATES PATENT OFFICE 2,377,650

BELT

Samuel R. Reimel, Akron, Ohio, assignor to The B. F. Goodrich Company, New York, N. Y., a corporation of New York Application October 24, 1942, Serial No. 463,201

4 Claims. (Cl. 198—193)

This invention relates to belts and more especially to conveyor belts for handling crushed rock, coal, ore and the like materials.

In the handling of such materials, wide belts of rubber and textile material are guided over troughing rollers to provide a moving trough in which the material is deposited and conveyed. These materials are often in large heavy pieces and in falling upon the belt set up localized strains which if not distributed adequately over an area of the belt surface cause damage to the layers of fabric which comprise the strength-supplying portion of the belt. Also in some services, as in the case of belts for mucking machines, it is sometimes desired to operate belts about relatively small diameter pulleys even though the belt be thick.

Prior constructions utilizing cords extending longitudinally of the belt, while possessing considerable flexibility, have had the disadvantage that impact and load stresses have not been well distributed over the width of the belt. Again, prior constructions utilizing cords extending transversely across the belt at 90 degrees or nearly so to the longitudinal direction of the belt, while being highly effective in distributing load and impact stresses over the width of the belt, have had the disadvantage that the stiffness of the belt has objectionably resisted flexibility, especially for deep troughing, and the transverse cords have not added materially to the resistance of the belt to tension loads.

The principal objects of the invention are to provide for utilizing the advantages of prior constructions, while avoiding or overcoming their disadvantages, to provide for effective distribution of load and impact forces across the belt while nevertheless facilitating transverse flexure of the belt for troughing, to provide improved impact resistance of the belt both longitudinally thereof and transversely, to provide for making possible thick but nevertheless effectively flexible belts, to provide greater longitudinal strength and permit use of thinner belts having cord breaker layers, and to provide greater anchorage for fasteners.

These and other objects will appear from the following description and the accompanying drawing.

Figure 2:
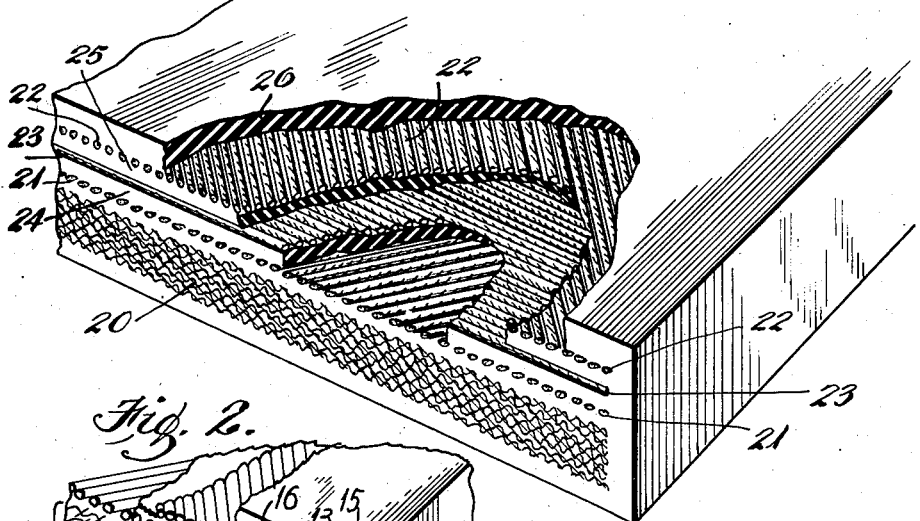

Of the drawing:

Fig. 1 is a perspective view of a portion of a belt constructed in accordance with and embodying the invention, parts being broken away, Fig. 2 is a similar view of another embodiment of the invention showing a modified construction, parts being broken away.

In accordance with the invention, a plurality of layers of transversely disposed cords are incorporated in the belt preferably above the reinforcing fabric or cord body of the belt and below the cover with the cords of the layers crossing each other and preferably embedded in a cushioning layer of rubber composition. Good results have been obtained with breaker plies in which the cords are disposed diagonally in opposite directions giving a balanced construction. For an odd number of plies a layer of cords disposed in the directly transverse direction may be associated with the diagonally disposed plies.

Referring to the drawing, and first to Fig. 1 thereof, the belt shown in the drawing and embodying the invention has a plurality of superimposed strength giving layers 10 of square woven fabric such as belt duck impregnated or frictioned and coated with rubber composition and laid with the warp threads lengthwise of the belt and the filler threads transverse thereof to provide a body 11. If desired this body may be formed of unwoven cords or cord fabric laid lengthwise of the belt.

Above the fabric or cord body 11, a plurality of breaker layers 12, 13 of cords are laid diagonally of the belt with the cords well protected by a layer 14 of resilient cushioning rubber material between the body and the cord breaker layer 12, a similar layer of resilient cushioning rubber composition 15 between the cord breaker layers 12, 13 protects the cords from sawing across each other.

A tough resilient layer 16 of rubber composition provides a protective covering over the cord layer 13 and may surround the entire body of the belt to provide an abrasion-resistant covering and to protect the textile material from moisture.

Figure 3:
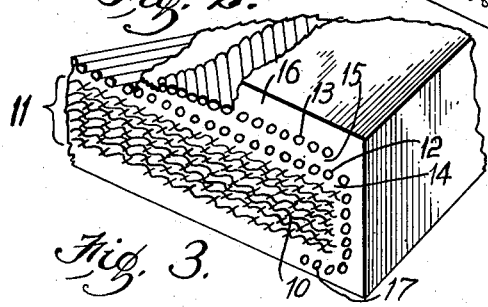

To provide for anchoring the cover more securely about the edges of the belt one or more of the layers of diagonal cords may be continued about the edges and under the margins of the belt body as indicated at 17 in Fig. 3.

As the cord breaker layers extend diagonally of the belt they permit troughing of the belt and distribute blows longitudinally as well as transversely of the belt. The cords are all separated from each other by rubber composition to resist abrasion and are conveniently rubberized by passing them through a calender and there applying rubber composition thereto. The calendered cords may be cut diagonally to provide blocks of sheet material which may be assembled in edge to edge relation to provide a sheet of diagonally disposed cushioned cords. This construction eliminates seams and provides a continuous sheet.

The use of diagonal cord breakers provides additional strength where belts are spliced with fasteners as they provide better anchorage of the fasteners.

By placing the cord breaker layers on each other in pairs, the cords of one layer balance any tendency of the cords of the other layer to cause the belt to run crooked and provide for distributing blows in all directions. The ends of the cords are preferably free from anchorage except by being embedded in the cushioning composition and for this reason are preferably terminated short of the side edges of the belt in the rubber material. Preferably the cords are laid at an angle of about 45 degrees to the longitudinal sides of the belt but this angle may be varied, a smaller angle providing even greater lateral flexibility and less resistance to troughing while adding materially to the longitudinal strength of the belt.

Where it is desired to employ an odd number of plies of breaker cords, a balanced construction may be obtained by laying the cords of two layers diagonally of the belt with their cords crossing each other and the odd layer with its cords at 90 degrees to the side edges of the belt as in Fig. 2, where the fabric body of the belt is designated by the numeral 20 and is the same construction as that of Fig. 1. The cord layers however comprise layers 21, 22 of cords laid diagonally of the belt and crossing each other, and the layer 23, therebetween comprises cords laid transversely of the belt at 90 degrees to its margins. The cords of layers 21 and 22 balance each other whereas the odd layer 23 being transverse to the belt does not need balancing. The odd layer may be placed above or below the crossed diagonal layers if desired. All of the layers are separated from each other by layers 24, 25 of cushioning rubber, and a covering 26 of tough rubber composition surrounds all of the textile material and protects it from abrasion and dampness.

In either of the illustrated embodiments of the invention the diagonal cords distribute shocks both longitudinally and transversely of the belt and permit troughing of the belt without buckling of the cords.

Variations may be made without departing from the scope of the invention as it is defined by the following claims.

I claim:

1. A conveyor belt for running in a troughed condition and receiving material on its face, said belt comprising a body of reinforcing material, a breaker structure thereon, and a protective covering on said breaker structure, said breaker structure comprising a plurality of layers of diagonally disposed cords with the cords of one layer crossing the cords of another and a layer of cords disposed transversely of the belt at substantially 90 degrees to its side edges and adjacent one of said layers of diagonally disposed cords.

2. A conveyor belt for running in a troughed condition and receiving material on its face, said belt comprising a body of textile material, a breaker structure thereon, and a protective covering on said breaker structure, said breaker structure comprising a plurality of layers of diagonally disposed cords with the cords of one layer crossing the cords of another and a layer of cords disposed transversely of the belt at substantially 90 degrees to its side edges, said last-named cord layer being disposed between diagonal layers of cords.

3. A conveyor belt for running in a troughed condition and receiving material on its face, said belt comprising a body of textile material, a breaker structure thereon, and a protective covering on said breaker structure, said breaker structure comprising a plurality of layers of cords disposed diagonally of the belt with the cords of the layers crossing each other, the ends of the cords of said layers being spaced from the longitudinal edges of the belt and embedded in cushioning material with the ends of the cords of a layer of diagonally disposed cords extending about the edges and under the margins of said body.

4. A conveyor belt comprising a body of material for resisting longitudinal tension, a body of rubber composition on the first said body, a breaker structure in said rubber composition, said breaker structure comprising a plurality of layers of cords disposed diagonally of the belt with the cords of the layers crossing each other and separated from one another by said rubber composition, and a layer of cords disposed transversely across the first said layers and substantially normal to the side edges of the belt, the cords of the transverse layer being separated from one another and from the cords of a diagonally disposed layer by said rubber composition.

SAMUEL R. REIMEL.

CERTIFICATE OF CORRECTION.

Patent No. 2,377,650. June 5, 1945.

SAMUEL R. REIMEL.

It is hereby certified that error appears in the printed specification of the above numbered patent requiring correction as follows: Page 1, second column, line 2, after the word and period "away." insert the following paragraph -

--Fig. 3 is a similar view showing a modification of the belt of Fig. 1.--;

and that the said Letters Patent should be read with this correction therein that the same may conform to the record of the case in the Patent Office.

Signed and sealed this 12th day of February, A. D. 1946.

Leslie Frazer (Seal)

First Assistant Commissioner of Patents.